(12) United States Patent
Zhao et al.

(10) Patent No.: US 10,169,105 B2
(45) Date of Patent: Jan. 1, 2019

(54) METHOD FOR SIMPLIFIED TASK-BASED RUNTIME FOR EFFICIENT PARALLEL COMPUTING

(71) Applicant: QUALCOMM Incorporated, San Diego, CA (US)

(72) Inventors: Han Zhao, Santa Clara, CA (US); Pablo Montesinos Ortego, Fremont, CA (US); Arun Raman, Fremont, CA (US); Behnam Robatmili, San Jose, CA (US); Gheorghe Calin Cascaval, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 14/992,268

(22) Filed: Jan. 11, 2016

(65) Prior Publication Data

US 2017/0031728 A1 Feb. 2, 2017

Related U.S. Application Data

(60) Provisional application No. 62/198,830, filed on Jul. 30, 2015.

(51) Int. Cl.
*G06F 9/46* (2006.01)
*G06F 9/52* (2006.01)
*G06F 9/48* (2006.01)

(52) U.S. Cl.
CPC .............. *G06F 9/52* (2013.01); *G06F 9/4843* (2013.01)

(58) Field of Classification Search
CPC ....................................................... G06F 9/52
See application file for complete search history.

(56) References Cited

U.S. PATENT DOCUMENTS

| 8,024,742 B2 | 9/2011 | Lescouet et al. |
| 8,789,046 B2 | 7/2014 | Franke et al. |
| 8,918,799 B2 | 12/2014 | Inglett et al. |
| 2008/0059677 A1 | 3/2008 | Archer et al. |
| 2011/0207431 A1* | 8/2011 | Sharma ............... H04L 12/14 455/406 |
| 2013/0268942 A1 | 10/2013 | Duluk, Jr. et al. |

(Continued)

OTHER PUBLICATIONS

Daniel Iercan, Contributions to the Development of Real-Time Programming Techniques and Technologies, Sep. 27, 2008.*

(Continued)

*Primary Examiner* — Dong U Kim
*Assistant Examiner* — Steven M Do
(74) *Attorney, Agent, or Firm* — The Marbury Law Group

(57) ABSTRACT

Aspects include computing devices, systems, and methods for implementing scheduling and execution of lightweight kernels as simple tasks directly by a thread without setting up a task structure. A computing device may determine whether a task pointer in a task queue is a simple task pointer for the lightweight kernel. The computing device may schedule a first simple task for the lightweight kernel for execution by the thread. The computing device may retrieve, from an entry of a simple task table, a kernel pointer for the lightweight kernel. The entry in the simple task table may be associated with the simple task pointer. The computing device may directly execute the lightweight kernel as the simple task.

30 Claims, 9 Drawing Sheets

(56) References Cited

U.S. PATENT DOCUMENTS

2014/0337389 A1* 11/2014 Ricketts ............ G06F 17/30292
707/803

OTHER PUBLICATIONS

Barekas V.K., et al., "Nanothreads vs. Fibers for the Support of Fine Grain Parallelism on Windows NT/2000 Plafforms", Security in Communication Networks, Third International Conference, Revised Papers | SCN 2002, Amalfi, Italy, Sep. 11-13, 2002, [Lecture Notes in Computer Science, ISSN 0302-9743], Springer Verlag, DE, vol. 1940, Jan. 1, 2000 (Jan. 1, 2000), pp. 149-159, XP002396133, DOI: 10.1007/3-540-39999-2_13, ISBN: 978-3-540-24128-7.
International Search Report and Written Opinion—PCT/US2016/038925—ISA/EPO—dated Sep. 8, 2016.
Miller B., et al., "RIOS: A Lightweight Task Scheduler for Embedded Systems," WESE '12 Proceedings of the Workshop on Embedded and Cyber-Physical Systems Education, 2012, 7 pages.

\* cited by examiner

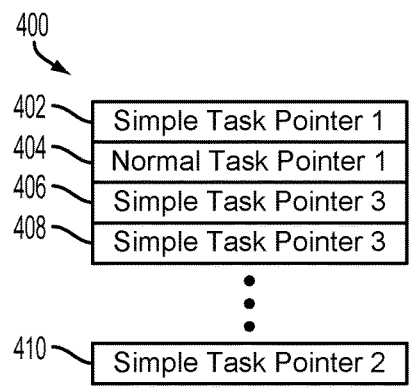
FIG. 4
FIG. 5
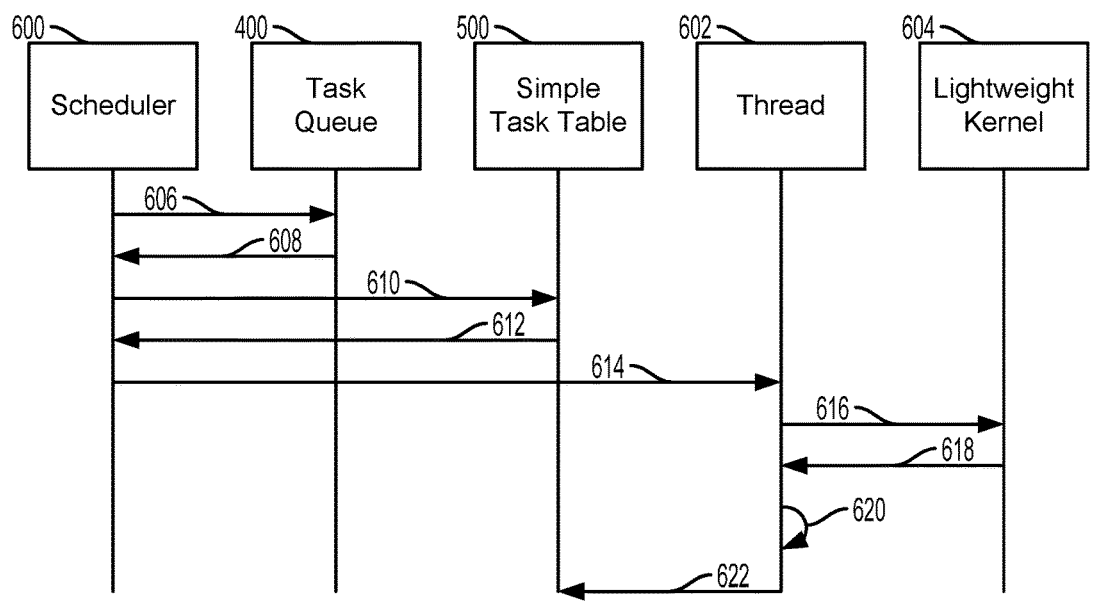
FIG. 6

METHOD FOR SIMPLIFIED TASK-BASED RUNTIME FOR EFFICIENT PARALLEL COMPUTING

RELATED APPLICATIONS

This application claims the benefit of priority under 35 U.S.C. § 119(e) of U.S. Provisional Application No. 62/198,830 entitled "Method For Simplified Task-based Runtime For Efficient Parallel Computing" filed Jul. 30, 2015, the entire contents of which are hereby incorporated by reference.

BACKGROUND

Task parallelism is a form of parallelization in which computational codes are parallelized across multiple processors. A computational task, serving as the basic schedulable unit in a parallel computing environment, embodies a computational procedure (hereafter referred to as "kernels") with or without certain inputs and outputs. A task-based parallel programming runtime allows programmers to express algorithms in the form of tasks, and uses a scheduler to distribute tasks across multiple processors and achieve maintenance functionalities, such as synchronization and load balancing. As task-based runtime systems mature and offer more features, task abstractions become increasingly complicated, imposing significant overhead to task creation, management, and destruction. For example, task-based runtime systems incur overhead in setting up a task in determining whether the task belongs to a heterogeneous device execution path, task referencing and un-referencing to track the task's lifecycle, and requesting exclusive ownership from the scheduler.

Because of the overhead of creating, dispatching and managing tasks is comparable to the actual computation, a traditional task-based runtime system adds significant overhead to lightweight kernels. Both performance and energy efficiency are impaired due to the unavoidable overhead associated with task management. A full-fledged task-based runtime system is suitable for heavyweight kernels with complex dependencies and synchronization requirements as parallelization occurs at lower frequencies due to these restrictions.

SUMMARY

The methods and apparatuses of various embodiments provide circuits and methods for scheduling and executing lightweight kernels in a computing device. Various embodiments may include determining whether a first task pointer in a task queue is a simple task pointer for a lightweight kernel, scheduling a first simple task for the lightweight kernel for execution by a first thread in response to determining that the first task pointer is a simple task pointer, retrieving a kernel pointer for the lightweight kernel from an entry of a simple task table in which the entry is associated with the simple task pointer, and directly executing the lightweight kernel as the first simple task.

Some embodiments may further include completing execution of the first simple task, and updating data of a kernel iteration counter of the entry of the simple task table.

Some embodiments may further include determining whether kernel iterations of the lightweight kernel are divisible, and dividing the kernel iterations of the lightweight kernel into iteration portions in response to determining that the kernel iterations of the lightweight kernel are divisible.

In such embodiments, scheduling a first simple task for the lightweight kernel for execution by a first thread may include assigning the first simple task with lightweight kernel at least one iteration portion, completing execution of the first simple task may include completing a number of executions of the first simple task equal to a number of iterations of the at least one iteration portion assigned to the first simple task, and updating data of a kernel iteration counter of the entry of the simple task table may include updating the data of the kernel iteration counter to reflect completion of the number of iterations of the at least one iteration portion assigned to the first simple task.

Some embodiments may further include determining whether all iterations of the first simple task are complete from the data of the kernel iteration counter, and clearing the entry of the simple task table in response to determining that all of the iterations of the first simple task are complete.

Some embodiments may further include identifying a restriction for executing the lightweight kernel. In such embodiments, the restriction may include one of a designated thread for executing the lightweight kernel, including a main thread, a critical thread, and a non-critical thread, a latency requirement for executing the lightweight kernel, and a proximity of a processor executing the first thread to a memory storing the lightweight kernel. In such embodiments, scheduling a first simple task for the lightweight kernel for execution by a first thread may include selecting the first thread based on the restriction for executing the lightweight kernel.

Some embodiments may further include determining whether a second task pointer in the task queue is the simple task pointer for the lightweight kernel, scheduling a second simple task for the lightweight kernel for execution by a second thread in response to determining that the second task pointer is the simple task pointer, retrieving the kernel pointer for the lightweight kernel from the entry of the simple task table in which the entry is associated with the simple task pointer, and directly executing the lightweight kernel as the second simple task.

Some embodiments may further include combining a first output of the first simple task and a second output of the second simple task.

Some embodiments may further include determining whether a requested process includes the lightweight kernel, determining whether the simple task table is full in response to determining that the requested process includes the lightweight kernel, creating the entry for the lightweight kernel in the simple task table in response to determining that the simple task table is not full, adding the simple task pointer associated with the entry to the task queue, and adding a normal task pointer associated with the lightweight kernel to the task queue in response to determining that the simple task table is full.

Various embodiments may include a computing device including a processor configured with processor-executable instructions to perform operations of one or more of the embodiment methods described above.

Various embodiments may include a computing device having means for performing functions of one or more of the embodiment methods described above.

Various embodiments may include a non-transitory processor-readable storage medium having stored thereon processor-executable instructions configured to cause a processor of a computing device to perform operations of one or more of the embodiment methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 4 is an illustration of an example task queue in accordance with various embodiments.

FIG. 5 is an illustration of an example simple task table in accordance with various embodiments.

FIG. 6 is process flow diagram illustrating runtime simple task scheduling and execution in accordance with various embodiments.

DETAILED DESCRIPTION

Figure 1:
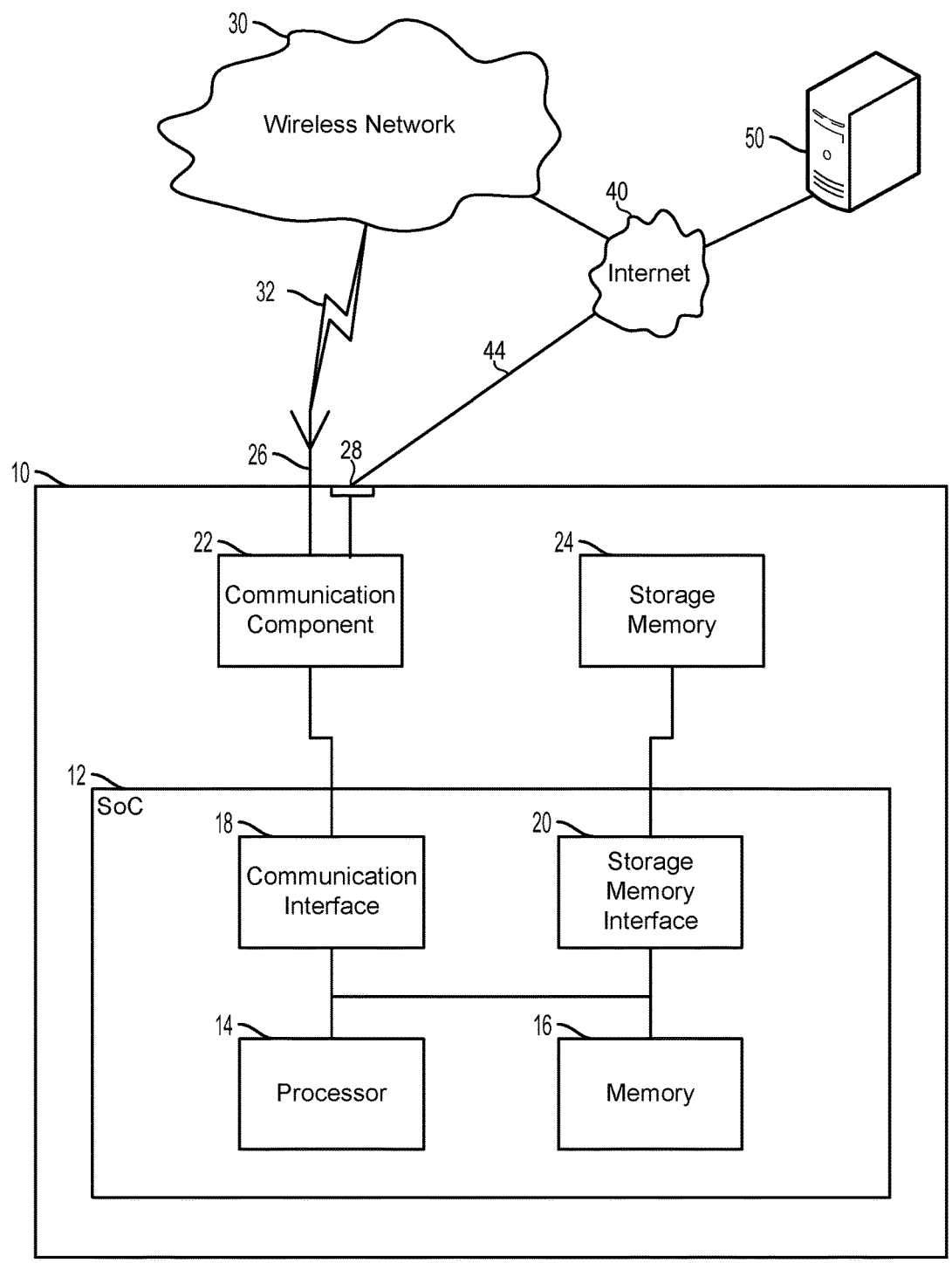
FIG. 1 is a component block diagram illustrating a computing device suitable for implementing various embodiments.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile computing device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a multi-core programmable processor. While the various aspects are particularly useful for mobile computing devices, such as smartphones, which have limited memory and battery resources, the aspects are generally useful in any electronic device that implements a plurality of memory devices and a limited power budget in which reducing the power consumption of the processors can extend the battery-operating time of a mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

Many applications configured to execute on modern computing devices entail highly parallelizable, lightweight computational procedures (hereafter referred to as "kernels") whose dependency and synchronization requirement are easy to meet. For instance, some applications include execution of back-to-back loops in which each iteration performs very little computational work. The overhead of creating, dispatching, and managing tasks in a traditional task-based runtime system adds significant overhead to parallelize such lightweight kernels, as the overhead is comparable to the actual computation and the parallelization may occur at a high rate.

Various embodiments include simple task management methods that bypass normal task management stages in runtime and reduce the overhead associated with normal task management. Simplified task management may be achieved by a runtime managed simple task table. Each entry of the simple task table may store pointers to the lightweight kernels. A simple task may be represented by a simple task pointer to an entry in the simple task table. This mechanism may simplify the job of the runtime scheduler without intruding on existing scheduling logic. A scheduler may retrieve a task pointer from the task queue as it would for any normal task. The task pointer may be a normal task pointer cast to a normal task, and the scheduler may use normal procedures to schedule the normal task. The task pointer may be a simple task pointer cast to an entry in the simple task table of a kernel pointer for a lightweight kernel. For a simple task pointer, the scheduler may assign the lightweight kernel to a thread for direct execution as a simple task by a processor or processor core. A simple task may allow a scheduler to schedule a task for execution by a thread as if the simple task is a normal task, but to execute the simple task the thread may directly execute the lightweight kernel without instantiating a task structure, managing the execution of the task, and dispatching the task structure.

FIG. 1 illustrates a system including a computing device 10 in communication with a remote computing device 50 suitable for use with the various embodiments. The computing device 10 may include an SoC 12 with a processor 14, a memory 16, a communication interface 18, and a storage memory interface 20. The computing device may further include a communication component 22 such as a wired or wireless modem, a storage memory 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The SoC 12 may include one or more processors 14. The computing device 10 may include more than one SoCs 12, thereby increasing the number of processors 14 and processor cores. The computing device 10 may also include one or more processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. In various embodiments, one or more memories 16 may include volatile memories such as random access memory (RAM) or main memory, or cache memory. These memories 16 may be configured to temporarily hold a limited amount of data and/or processor-executable code instructions that is requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store processor-executable code, at least temporarily, that is loaded to the memory 16 from another memory device, such as another memory 16 or storage memory 24, for access by one or more of the processors 14. The processor-executable code loaded to the memory 16 may be loaded in response to execution of a function by the processor 14. Loading the processor-executable code to the memory 16 in response to execution of a function may result from a memory access request to the memory 16 that is unsuccessful, or a miss, because the requested processor-executable code is not located in the memory 16. In response to a miss, a memory access request to another memory device may be made to load the requested processor-executable code from the other memory device to the memory device 16. Loading the processor-executable code to the memory 16 in response to execution of a function may result from a memory access request to another memory device, and the processor-executable code may be loaded to the memory 16 for later access.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage memory interface 20 and the storage memory 24 may work in unison to allow the computing device 10 to store data and processor-executable code on a non-volatile storage medium. The storage memory 24 may be configured much like various embodiments of the memory 16 in which the storage memory 24 may store the data and/or processor-executable code for access by one or more of the processors 14. The storage memory 24, being non-volatile, may retain the information even after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the necessary functions. Moreover, the computing device 10 may not be limited to one of each of the components, and multiple instances of each component may be included in various configurations of the computing device 10.

Figure 2:
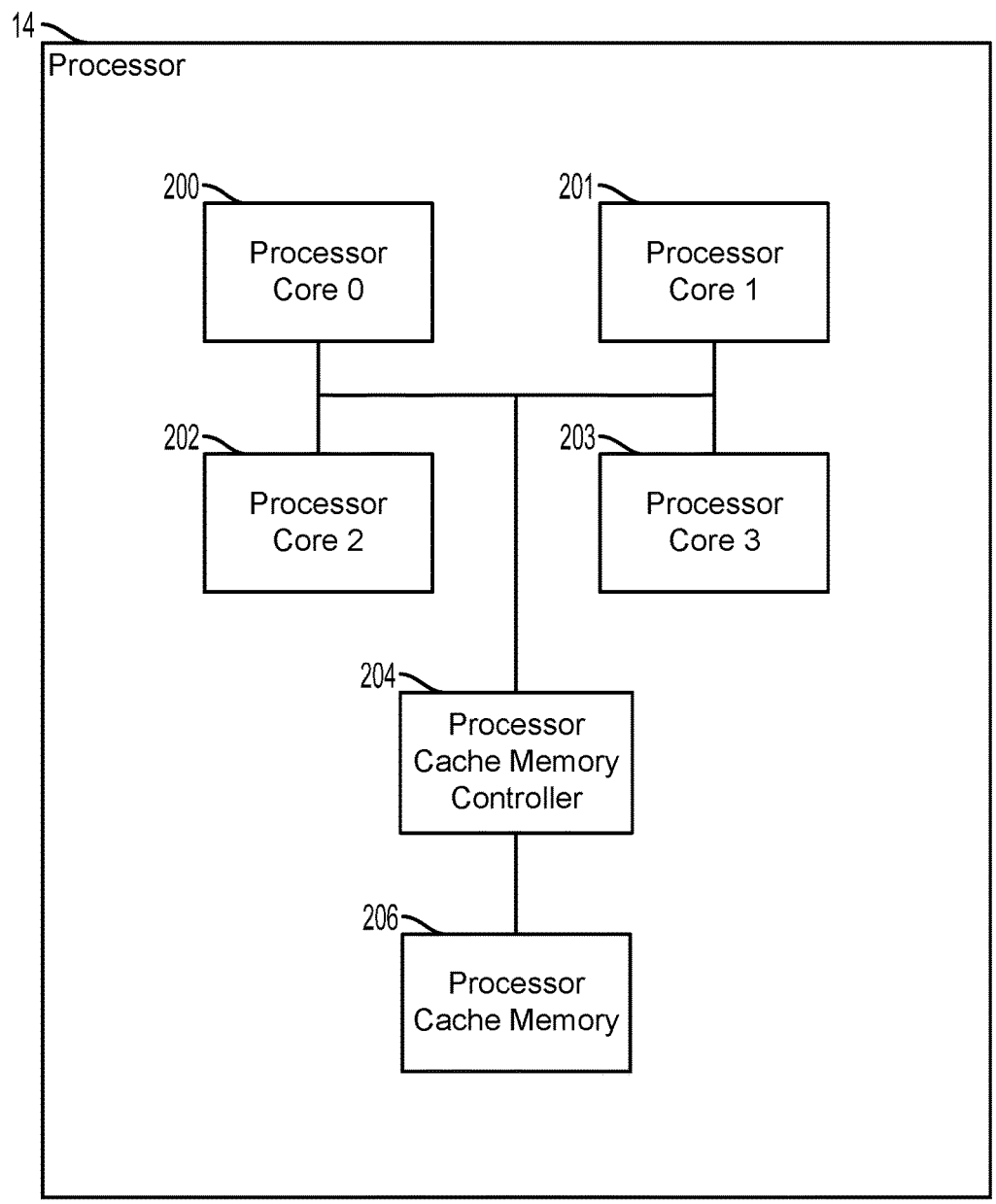
FIG. 2 is a component block diagram illustrating an example multi-core processor suitable for implementing various embodiments.

FIG. 2 illustrates a multi-core processor 14 suitable for implementing various embodiments. With reference to FIG. 1, the multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. An example of such heterogeneous processor cores may include what are known as "big.LITTLE" architectures in which slower, low-power processor cores may be coupled with more powerful and power-hungry processor cores. The heterogeneity of such heterogeneous processor cores may include different instruction set architecture, pipelines, operating frequencies, etc.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and are not meant to limit the various aspects to a four-core processor system. The computing device 10, the SoC 12, or the multi-core processor 14 may individually or in combination include fewer or more than the four processor cores 200, 201, 202, 203 illustrated and described herein.

Further, the multi-core processor 14 may include a processor cache memory controller 204 and a processor cache memory 206. The processor cache memory 206 may be similarly configured to the memory 16 (reference FIG. 1). The processor cache memory controller 204 and the processor cache memory 206 may work in unison to allow the processor cores 200, 201, 202, 203 to access and temporarily hold a limited amount of data and/or processor-executable code on volatile storage medium. The processor cache memory controller 204 may control access to the processor cache memory 206 and allow the processor cores 200, 201, 202, 203 to read from and write to the processor cache memory 206. The processor cores 200, 201, 202, 203 may share the processor cache memory 206 and/or the individual processor cores 200, 201, 202, 203 may be associated with a dedicated processor cache memory 206. The single pair of the processor cache memory controller 204 and the processor cache memory 206 is used for ease of illustration, and is not intended to limit the number of processor cache memory controllers 204 and processor cache memories 206 that may be included on the multi-core processor 14.

Figure 3:
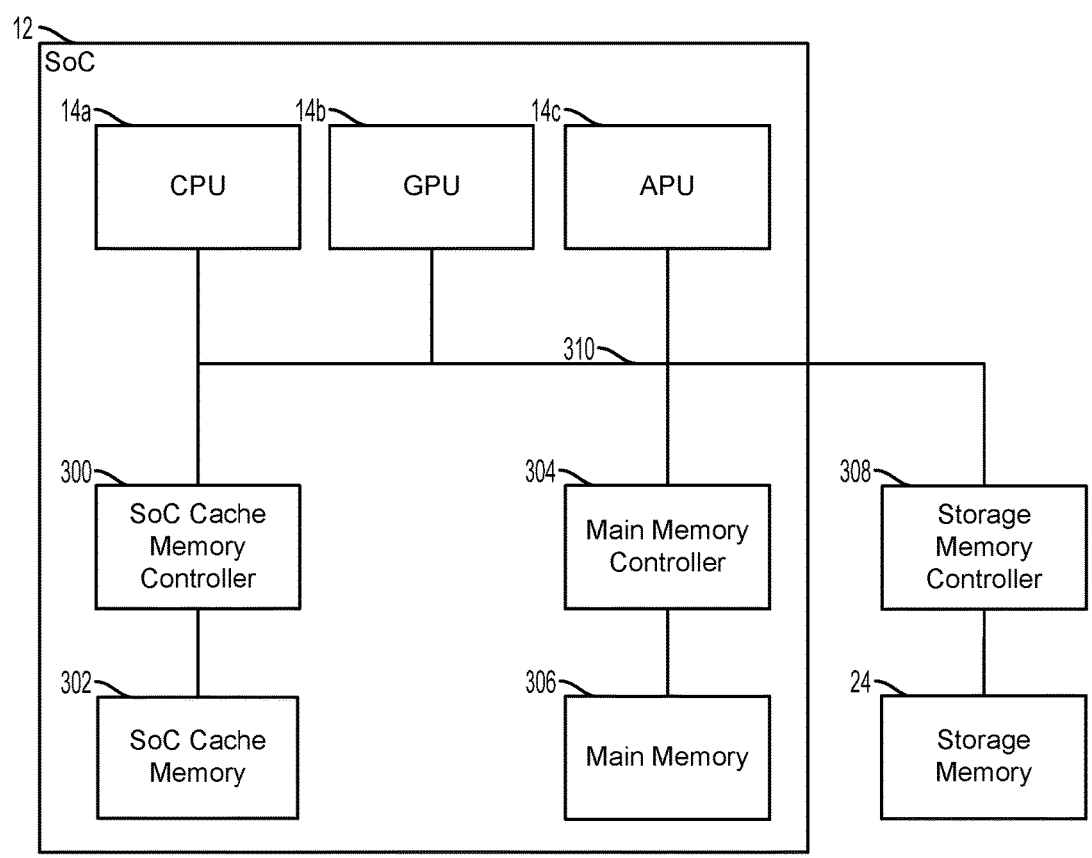
FIG. 3 is a component block diagram illustrating an example system on chip (SoC) suitable for implementing various embodiments.

FIG. 3 illustrates an example SoC 12 suitable for implementing various embodiments. With reference to FIGS. 1, 2 and 3, the SoC 12 may include a processor 14, an SoC cache memory controller 300, an SoC cache memory 302, a main memory controller 304, a main memory 306, and other components such as the components of the SoC 12 described above. The SoC 12 may also include or be communicatively connected to a storage memory controller 308 and the storage memory 24. The components of the SoC 12 and the component connected to the SoC 12 may be connected to each other via a communication bus 310. Each of the SoC cache memory 302, the main memory 306, and the storage memory 24 may be configured to store memory contents, such as data and/or processor-executable code. The memory contents may be stored in specific locations identified by physical addresses of the SoC cache memory 302, the main memory 306, and the storage memory 24.

In an aspect, memory access requests to the memories 24, 302, 306 may be made using a virtual address that may be translated to the physical address of the respective memory 24, 302, 306 in order to retrieve the requested memory contents of the memory access request. The storage locations of any of the data and/or processor-executable code may change with time. The physical addresses associated with the data and/or processor-executable code may be updated in a data structure mapping the locations of the data and/or processor-executable code for access by the processor 14.

The SoC cache memory 302 may be configured to temporarily store data and/or processor-executable code for quicker access than is achievable accessing the main memory 306 or the storage memory 24. The SoC cache memory 302 may be dedicated for use by a single processor 14, such as a CPU 14a, GPU 14b, or APU 14c, or shared between multiple processors 14, such as any combination of the CPU 14a, GPU 14b, and APU 14c, and/or subsystems (not shown) of the SoC 12. The SoC cache memory 302 may be similarly configured to the memory 16 (reference FIG. 1) and the processor cache memory 206 (reference FIG. 2). The SoC cache memory controller 300 may manage access to the SoC cache memory 302 by the various processors 14a-14c and the subsystems (not shown) of the SoC 12. The SoC cache memory controller 300 may also manage memory access requests for access from the SoC cache memory controller 300 to the main memory 306 and the storage memory 24 for retrieving memory contents that may be requested from the SoC cache memory 302 by a processor 14a-14c, but not found in the SoC cache memory 302 resulting in a cache miss.

The main memory 306 may be configured to temporarily store data and/or processor-executable code for quicker access than when accessing the storage memory 24. The main memory 306 may be available for access by the processors 14a-14c of one or more SoCs 12, and/or subsystems (not shown) of the SoC 12. The main memory controller 304 may manage access to the main memory 306 by various processors 14a-14c and subsystems (not shown) of the SoC 12 and computing device. The main memory controller 304 may also manage memory access requests for access by the main memory controller 304 to the storage memory 24 for retrieving memory contents that may be requested from the main memory 306 by the processors 14a-14c or the SoC cache memory controller 300, but not found in the main memory 306 resulting in a main memory miss.

The storage memory 24 may be configured to provide persistent storage of data and/or processor-executable code for retention when the computing device is not powered. The storage memory 24 may have the capacity to store more data and/or processor-executable code than the SoC cache memory 302 and the main memory 306, and to store data and/or processor-executable code including those not being used or predicted for used in the near future by the processors 14a-14c or subsystems (not shown) of the SoC 12. The storage memory 24 may be available for access by the processors 14a-14c of one or more SoCs 12, and/or subsystems (not shown) of the SoC 12. The storage memory controller 308 may manage access to the storage memory 24 by various processors 14a-14c and subsystems (not shown) of the SoC 12 and computing device. The storage memory controller 308 may also manage memory access requests for access from the SoC cache memory controller 300 and the main memory controller 304 to the storage memory 24 for retrieving memory contents that may be requested from the SoC cache memory 302 or the main memory 306 by the processors 14a-14c, but not found in the SoC cache memory 302 or the main memory 306 resulting in a cache memory miss or a main memory miss.

Some or all of the components of the SoC 12 may be differently arranged and/or combined while still serving the necessary functions. Moreover, the SoC 12 may not be limited to one of each of the components, and multiple instances of each component may be included in various configurations of the SoC 12. Various embodiment configurations of the SoC 12 may include components, such as the CPU 14a, the GPU 14b, the APU 14c, the main memory controller 304, and the main memory 306 separate from, but connected to the SoC 12 via the communication buses 310. Various embodiment configurations may include any single processor 14 or combination of processors 14, including homogenous or heterogeneous combinations of processors 14. Similarly, the computing device 10 (FIG. 1) may include any SoC 12 or combination of SoCs 12, including homogenous or heterogeneous combinations of SoCs 12.

FIG. 4 illustrates an example of a task queue 400 in accordance with various embodiments. With reference to FIGS. 1-4, the task queue 400 may include a collection and organization of task pointers for indicating to a scheduler the tasks of various processes to be scheduled for execution by a processor. The task queue 400 may be implemented in various forms of memory 16, 24, 206, 306, or dedicated hardware, such as a register, accessible by the scheduler run by a processor 14. In various embodiments, one or more schedulers and task queues 400 may be implemented on a computing device 10 for groups of processors and SoCs. The task queue 400 may include slots 402, 404, 406, 408, 410 configured to store a variety of task pointers, including normal task pointers and simple task pointers. The simple task pointers may be configured such that they are cast to a data entry for a lightweight kernel as described further with reference to FIG. 5. The normal task pointers may be configured such that they are cast to a location in memory 16, 24, 206, 306 for any kernel other than a lightweight kernel. In various embodiments, the simple task pointers and normal task pointers may be cast to values that do not overlap with the value of the other type of task pointer. Thus, the scheduler may identify whether the task pointer is a simple task pointer or a normal task pointer by their cast values, as described further with reference to FIG. 5.

In the example illustrated in FIG. 4, the task queue slot 404 contains a normal task pointer (normal task pointer 1), and the task queue slots 402, 406, 408, and 410 contain simple task pointers (slot 402 containing simple task pointer 1, slots 406 and 408 containing simple task pointer 3, and slot 410 containing simple task pointer 2). The task queue 400 may include any number of slots greater than or fewer than the five slots 402-410 in the illustrated example.

In various embodiments, the task queue 400 may be managed in a first-in first-out (FIFO) manner. As such, the scheduler may read the top slot, in this example slot 402, having the oldest task pointer, and the top slot may be removed, or the old task pointer may be deleted or overwritten so that the remaining task pointers are shifted up in the task queue 400 to their respective the next slots. Other task queue management policies may be implemented, such as a policy that doesn't remove or replace a task pointer until its associated task is scheduled, and if the task cannot be scheduled the task queue 400 is shuffled so that the task pointer that cannot be executed is moved to another slot 402-410 in the task queue 400 or the scheduler temporarily skips to another slot 402-410 in the task queue 400. A task queue management policy may also be priority based, in which priorities may be determined by various factors, including criticality of a task, which may be based on the tasks conflicts and dependencies. Priorities may be assigned to each task in the task queue influencing the slot that is the next slot read, or the priorities may influence the order in which the tasks are ordered in the task queue.

FIG. 5 illustrates an example of a simple task table 500 in accordance with various embodiments. The simple task table 500 may include a collection and organization of data stored in various forms of memory 16, 24, 206, 306. The table format of the simple task table 500 illustrated in FIG. 5 and described herein is an example of a format for storing and organizing the data, and is not limiting as to other embodiments for storing and organizing the data using other data structures.

In the example illustrated in FIG. 5, the simple task table 500 may organize and maintain relationships between a kernel identifier (ID), a kernel pointer, and a kernel iteration counter in, for example, columns 502, 504, 506 for each entry, or row, 508, 510, 512, 516 of a task for a lightweight kernel, or simple task. The kernel identifier column 502 may include a kernel identifier configured to indicate to a scheduler an entry 508-516 for a simple task in the simple task table 500. The scheduler may use the kernel identifier of an entry 508-516 to aid in identifying whether a lightweight kernel is to be scheduled for execution, which lightweight kernel is to be scheduled for execution, and whether the lightweight kernel has completed execution by guiding the scheduler to the associated entry 508-516. The simple task pointers may be cast to integral values whose maximum may be the number of entries in the kernel table, and normal task pointers may be cast to hex pointer values, which will not overlap with the integral values of simple tasks. Based on the different values cast to the different pointers, the scheduler may identify whether the task pointer is a simple task pointer or a normal task pointer. In the example illustrated in FIG. 5, the value cast to a simple task pointer may be the kernel identifier in the simple task table 500, which, for example, may be an integer value, and the normal task pointer may be cast to a physical or virtual memory address, which, for example, may be a hexadecimal value. Based on the value cast to the task pointer, the scheduler may determine whether the task pointer is a simple task pointer for a simple task or a normal task pointer for a normal task.

Once the scheduler has identified the entry 508-516 associated with a kernel identifier, the scheduler may read the kernel pointer from the kernel pointer column 504 and the kernel iteration counter from the kernel iteration counter column 506 for the entry 508-516. The kernel pointer may provide to the scheduler a physical or virtual memory address for retrieving the lightweight kernel to be implemented as a simple task. The kernel iteration counter may provide to the scheduler a total number of kernel execution iterations to be executed for the simple task.

In the example in FIG. 5, the kernel iteration counter column 506 includes kernel iteration counter values shown as integer values representing the total number of kernel execution iterations to be executed for the simple task. In various embodiments, the kernel iteration counter column 506 the kernel iteration counter values may include a string of various symbolic representations in which different positions in the string represent different characteristics of the lightweight kernel. For example, different positions in the string may represent the total number of kernel execution iterations to be executed for the simple task, a divisor of the total number of kernel execution iterations to be executed for the simple task (e.g., a constant value or a value dependent upon thread availability), a total number of kernel execution iterations executed for the simple task, and restrictions for executing the lightweight kernel. In various embodiments, restrictions for executing the lightweight kernel may include designating a thread for executing the lightweight kernel, including a main thread, a critical thread, a non-critical thread, a latency requirement for executing the lightweight kernel, a proximity of the processor executing the thread to the memory storing the lightweight kernel. The simple task executing for the lightweight kernel may read and update the kernel iteration counter value before and after execution of the lightweight kernel.

In various embodiments, the simple task table 500 may be a globally accessible, centralized simple task table 500, or globally or locally accessible distributed simple task tables 500. The distributed simple task table 500 may be located in close proximity to the execution device of the lightweight kernels, such as on a memory 16, 24, 206, 306 of a processor 14 designated to execute the lightweight kernels. For example, a GPU 14b may use a separate simple task table 500 in its own memory 16, 24, 206, 306 to process specialized computational tasks.

In various embodiments, the simple task table 500 may provide simple synchronization functionalities for simple tasks. For example, to execute back-to-back loops, multiple simple tasks may execute the same lightweight kernels. The multiple simple tasks may be assigned a number of iterations to complete, and execution of a loop may complete once all the simple tasks complete their assigned iterations. A fork-join synchronization pattern may be implemented for the loop via bookkeeping in the simple task table 500 by updating the data in the kernel iteration counter in response to a simple task completing execution of its assigned iterations.

The example illustrated in FIG. 5 includes N entries 508-516 in the simple task table 500. In various embodiments, the value of N may be capped at different numbers. The simple task table 500 may be full when there are N entries 508-516 in the simple task table 500, and additional entries may not be added to the simple task table until an existing entry 508-516 is invalidated or removed based on the completion of execution of the total number of iterations for the lightweight kernel associated with the existing entry 508-516. As a result, lightweight kernels may not be entered into the simple task table 500 because there is no space available, and these un-entered lightweight kernels may be executed as normal tasks.

FIG. 6 is an illustration of a process flow of runtime simple task scheduling and execution in accordance with various embodiments. A scheduler 600 and a thread 602 may be executed by any processor or combination of processors 14 in a computing device. In some embodiments, the scheduler 600 may be implemented in dedicated hardware. For ease of reference, the processor(s) executing a scheduler module as well as dedicated scheduler hardware are referred to generically as the scheduler 600. Further, the task queue 400, the simple task table 500, and a lightweight kernel 604 may be stored on any combination of memories 16, 24, 206, 306 of the computing device. In various embodiments, the task queue 400, the simple task table 500, and a lightweight kernel 604 may be stored on any combination of memories 16, 24, 206, 306 in close proximity to the combination of processors 14 executing the scheduler 600 and the thread 602 in order to reduce latency and resource requirements for executing the lightweight kernel 604. In various embodiments, multiple schedulers 600, threads 602, task queues 400, simple task tables 500, and lightweight kernels 604 may be implemented on a computing device.

In the example embodiment illustrated in FIG. 6, the scheduler 600 may access the task queue 400 to read a slot of the task queue 606 and retrieve a simple task pointer 608. Following the direction of the simple task pointer, the scheduler 600 may access the simple task table 500 to read an entry designated by the simple task pointer 610 and retrieve data of the entry 612, which may include the kernel pointer and the kernel iteration counter value. The scheduler 600 may identify an available thread 602 for executing a simple task and pass instructions for executing the simple task 614 to the thread 602, which may include instructions to execute the lightweight kernel 614 as a simple task (rather than a normal task), the kernel pointer, and the number of kernel execution iterations to be executed for the simple task. The scheduler 600 may take into account restrictions placed on the execution of the lightweight kernel, which may be indicated in the kernel interaction counter data, when selecting a thread for executing the lightweight kernel. The thread 602 may use the information from the received instructions to access a memory to read a memory location 616 designated by the kernel pointer, and retrieve the lightweight kernel 604 from the memory location 618. The thread 602 may directly execute the lightweight kernel as a simple task 620. The thread 602 may access the simple task table 500 to update the entry for the executed simple task 622, which may include updating the data of the kernel iteration counter value, or invalidating or deleting the entry.

Figure 7:
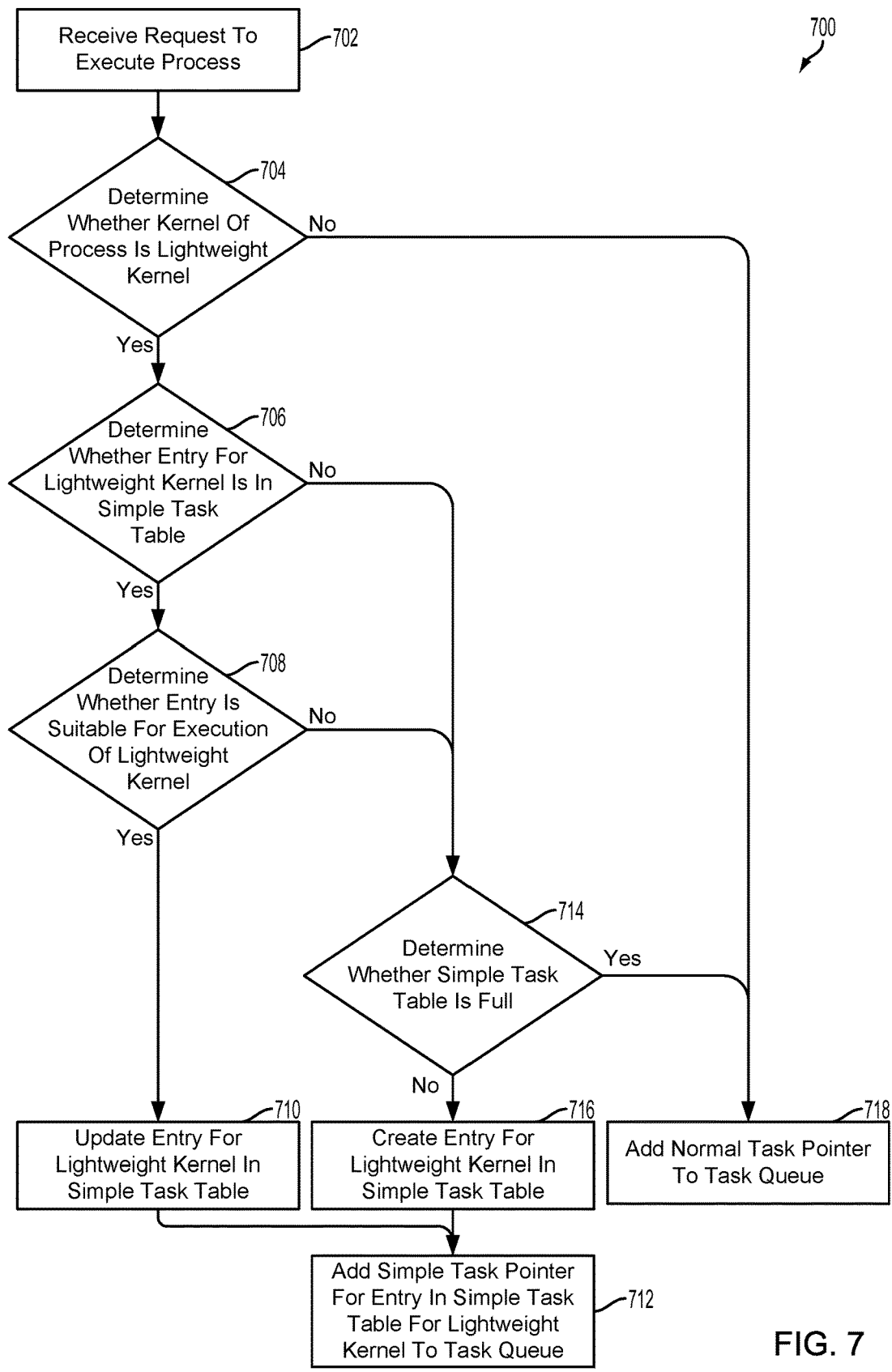
FIG. 7 is process flow diagram illustrating an embodiment method for queuing a simple task.

FIG. 7 illustrates an embodiment method 700 for queuing a simple task. The method 700 may be executed in a computing device using software executing in general purpose hardware, such as a processor or processor core, in dedicated hardware, or in a combination of software executing in a processor and dedicated hardware.

In block 702, the computing device may receive a request to execute a process. The request may include a call from an operating system or a program executing on the computing device, or interpreted from a hardware signal triggered on the computing device.

In determination block 704, the computing device may determine whether a computational procedure of the processes is a lightweight kernel that can be executed as a simple task. In various embodiments, elements of a process that are lightweight kernels may be preprogrammed to be identifiable as lightweight kernels and the computing device may be informed of the lightweight kernels of the processes requested for execution. In various embodiments, the computing device may be preprogrammed to identify types of computational procedures as lightweight kernels, and the computing device may inspect the elements of a processes requested for execution to determine whether any of the elements are of a type that indicates a lightweight kernel.

In response to determining that the processes requested for execution do not contain a lightweight kernel that can be executed as a simple task (i.e., determination block 704="No"), the computing device may add a normal task pointer to the task queue for the kernel to be executed in block 718.

In response to determining that the processes requested for execution contains a lightweight kernel that can be executed as a simple task (i.e., determination block 704="Yes"), the computing device may determine whether an entry for the lightweight kernel exists in the simple task table in determination block 706. Checking for the entry for the lightweight kernel in the simple task table may include comparing the memory location cast to the kernel pointers in the simple task table to the memory location of the lightweight kernel.

In response to determining that an entry for the lightweight kernel exists in the simple task table (i.e., determination block 706="Yes"), the computing device may determine whether the existing entry is suitable for the requested execution of the lightweight kernel in determination block 708. In various embodiments, some executions of the lightweight kernel may differ from other executions of the lightweight kernel based on various characteristics for the execution of the lightweight kernel indicated by the associated data represented in the kernel iteration counter. The computing device may use the characteristics for the execution of the lightweight kernel represented in the kernel iteration counter associated with a matching kernel pointer for the lightweight kernel to determine whether the entry for the lightweight kernel is suitable for casting to a simple task pointer for the requested execution of the lightweight kernel.

In response to determining that the existing entry is suitable for the requested execution of the lightweight kernel (i.e., determination block 708="Yes"), the computing device may update the existing entry for the lightweight kernel in the simple task table in block 710. Updating the existing entry may include updating the characteristic data for executing the lightweight kernel indicated by the associated data represented in the kernel iteration counter, such as the number if iterations of the execution of the lightweight kernel.

In response to determining that an entry for the lightweight kernel does not exist in the simple task table (i.e., determination block 706="No") or in response to determining that an entry is not suitable for execution of a lightweight kernel (i.e., determination block 708="No"), the computing device may determine whether the simple task table is full in determination block 714. The simple task table may be of a limited size capable of retaining N entries. The computing device may compare the number of existing entries to the capacity of the simple task table to determine whether additional entries may be added to the simple task table.

In response to determining that the simple task table is full (i.e., determination block 714="Yes"), the computing device may add a normal task pointer to the task queue for the lightweight kernel in block 718.

In response to determining that the simple task table is not full (i.e., determination block 714="No"), the computing device may create an entry for the lightweight kernel in the simple task table in block 716. The computing device may create a new entry with a unique kernel identifier that indicates a lightweight kernel for execution as a simple task and the location of the entry in the simple task table, a kernel pointer to a physical or virtual memory location for the lightweight kernel, and the kernel iteration counter data specifying the characteristics for executing the lightweight kernel.

In block 712, the computing device may add the simple task pointer updated in block 710 or created in block 716 to the task queue for the existing entry in the simple task table for the lightweight kernel. The simple task pointer may be cast to the kernel identifier for the existing entry.

Figure 8:
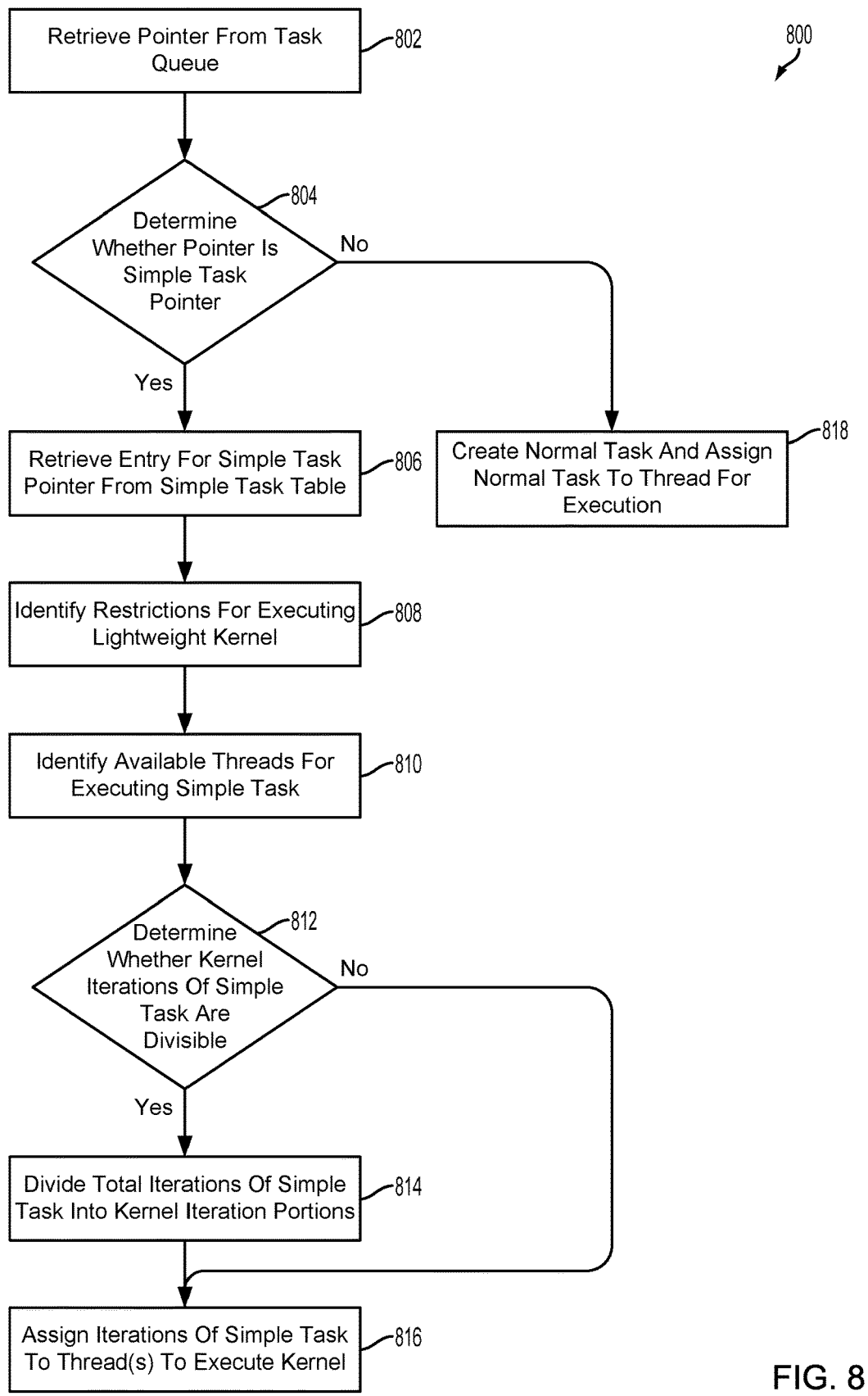
FIG. 8 is process flow diagram illustrating an embodiment method for scheduling a simple task.

FIG. 8 illustrates an embodiment method 800 for scheduling a simple task. The method 800 may be executed in a computing device using software executing in general purpose hardware, such as a processor or processor core, in dedicated hardware, or in a combination of software executing in a processor and dedicated hardware.

In block 802, the computing device may retrieve a pointer from the task queue. The pointer retrieved may be dictated by the task queue management policy, which may include a first-in first-out task queue management policy, an availability based task queue management policy, a priority based task queue management policy, or a combination of these task queue management policy as discusses herein.

In determination block 804, the computing device may determine whether the retrieved pointer is a simple task pointer. Simple task pointers and normal task pointers may be cast to values that do not overlap with the value of the other type of task pointer, thereby providing a way to identify whether the task pointer is a simple task pointer or a normal task pointer by their cast values. In various embodiments, the value cast to a simple task pointer may be the kernel identifier in the simple task table, which, for example, may be an integer value, and the normal task pointer may be cast to a physical or virtual memory address, which, for example, may be a hexadecimal value. Based on the value cast to the task pointer, the computing device may determine whether the task pointer is a simple task pointer for a simple task or a normal task pointer for a normal task.

In response to determining that the retrieved pointer is not a simple task pointer (i.e., determination block 804="No"), the computing device may create a normal task and assign the normal task to a thread for execution in block 818.

In response to determining that the retrieved pointer is a simple task pointer (i.e., determination block 804="Yes"), the computing device may retrieve the entry associated with the simple task pointer from the simple task table in block 806. As described herein, the simple task pointer may be cast to the kernel identifier of an entry in the simple task table, thus the computing device may retrieve the entry of the simple task table having a kernel identifier matching the value cast to the retrieved simple task pointer. Retrieving the entry may also include retrieving the kernel pointer and the data of the kernel iteration counter of the entry.

In block 808, the computing device may identify any restrictions for executing the lightweight kernel of the entry associated with the simple task pointer. As described, restrictions on the execution of the lightweight kernel may be included in the data of the total kernel iterations. The computing device may check designated locations in the data of the total kernel iterations for symbolic representations of the restrictions. The restrictions may include designating a thread for executing the lightweight kernel, including a main thread, a critical thread, a non-critical thread, a latency requirement for executing the lightweight kernel, a proximity of the processor executing the thread to the memory storing the lightweight kernel.

In block 810, the computing device may identify available threads for executing the lightweight kernel as a simple task, directly executing the lightweight kernel without creating a normal task. Identifying the available threads may take into account whether an available thread satisfies any restrictions for executing the lightweight kernel.

In determination block 812, the computing device may determine whether the kernel iterations to be executed as a simple task are divisible. As described, including the total number of kernel execution iterations to be executed for the simple task, and a divisor of the total number of kernel execution iterations to be executed for the simple task may be included in the data of the total kernel iterations. The computing device may check designated locations in the data of the total kernel iterations for the total number of kernel execution iterations and the divisor of the total number of kernel execution iterations to determine whether the kernel iterations are divisible and how to divide the kernel iterations for assignment to the available threads.

In response to determining that the kernel iterations to be executed as a simple task are divisible (i.e., determination block 812="Yes"), the computing device may divide the total iterations for execution as a simple task into kernel iteration portions in block 814. In various embodiments, the kernel iteration portions may be such that they symmetrically or asymmetrically spread the kernel iterations across the available threads. In various embodiments, the kernel iteration portions may be such that they account for all of the total iterations in a number of kernel iteration portions greater than, equal to, or less than the number of available threads.

In response to determining that the kernel iterations to be executed as a simple task are not divisible (i.e., determination block 812="No") or after dividing the total iterations for execution as a simple task into kernel iteration portions, the computing device may assign some or all of the kernel iteration portions to be executed as simple tasks to one or more available threads in block 816. Assignment of the kernel iteration portions for execution may take into account whether an available thread satisfies any restrictions for executing the lightweight kernel.

Figure 9:
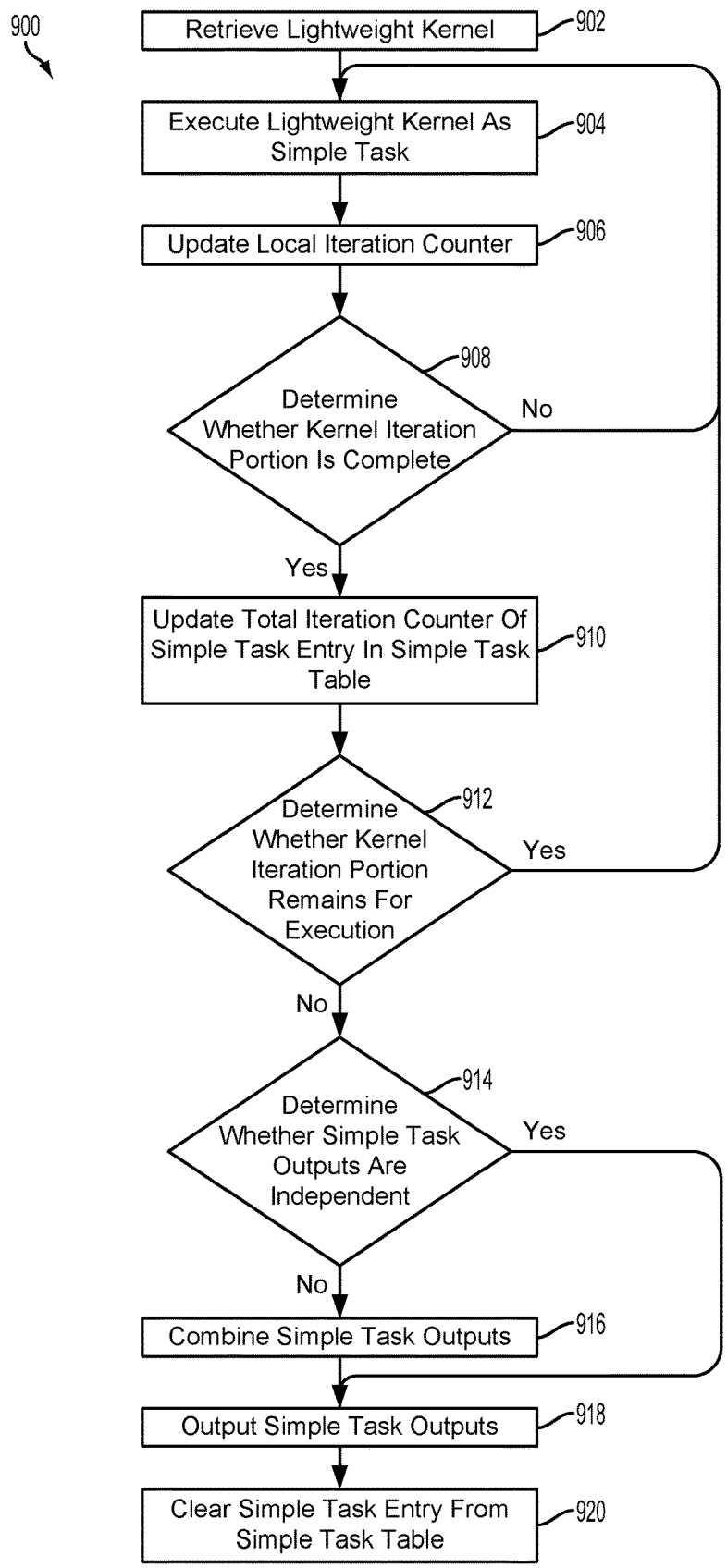
FIG. 9 is process flow diagram illustrating an embodiment method for executing a simple task.

FIG. 9 illustrates an embodiment method 900 for executing a simple task. The method 900 may be executed in a computing device using software executing in general purpose hardware, such as a processor or processor core, in dedicated hardware, or in a combination of software executing in a processor and dedicated hardware.

In block 902, the computing device may retrieve the lightweight kernel. The computing device may use the kernel pointer of the entry associated with a simple task pointer to retrieve the lightweight kernel from the memory location cast to the kernel pointer.

In block 904, the computing device may execute the lightweight kernel as a simple task. The computing device may use the retrieved lightweight kernel and respond to the assignment of the simple task to a thread by directly executing the lightweight kernel without first creating the construct of a normal task, thereby avoiding having to manage the conflicts and dependencies of a normal task during execution, and dispatching the normal task upon completion. Thus, while execution of a lightweight kernel may be scheduled like a task, specifically using a simple task, executing the lightweight kernel as a simple task avoids the overhead in resource consumption required for scheduling and executing normal tasks.

In block 906, the computing device may update a local iteration counter for the execution of the kernel iteration portion. Updating the local iteration counter may include incrementing, decrementing, or using an algorithm to indicate the number of kernel iterations executed or left for execution in the kernel iteration portion.

In determination block 908, the computing device may determine whether the kernel iteration portion is complete. In various embodiments, the computing device may compare a number of executed iterations in of the simple task in the local iteration counter to the number of iterations of the kernel iteration portion, or may check whether the local iteration counter is equal to a given value, such as zero. In response to determining that the kernel iteration portion is not complete (i.e., determination block 908="No"), the computing device may execute the lightweight kernel as a simple task in block 904 and update the local iteration counter for the execution of the kernel iteration portion in block 906 as described.

In response to determining that the kernel iteration portion is complete (i.e., determination block 908="Yes"), the computing device may update the total iteration counter of the entry for the simple task in the simple task table in block 910. In various embodiments, updating the total iteration counter may include adding the number of iterations of the completed kernel iteration portions to the number of kernel iterations completed represented in the data of the total iteration counter, or deducting the number of iterations of the completed kernel iteration portions from the number of kernel iterations to be completed in the data of the total iteration counter. In various embodiments, the number of kernel iterations completed or to be completed may be represented by the number of kernel iterations, by the number of kernel iteration portions, or by a symbolic value representing kernel iterations or kernel iteration portions.

In determination block 912, the computing device may determine whether any kernel iteration portions remain for execution. An unexecuted kernel iteration portion may be assigned to a particular thread or assigned to a group of threads. In response to determining that a kernel iteration portion remains for execution (i.e., determination block 912="Yes"), the computing device may execute the lightweight kernel as a simple task in block 904 as described.

In response to determining that a kernel iteration portion does not remain for execution (i.e., determination block 912="No"), the computing device may determine whether a simple task output for a kernel iteration portion is independent of another simple task output for another kernel iteration portion in determination block 914. In this manner, the computing device may manage simple synchronization of the lightweight kernel executions. For example, the computing device may implement a fork-join paradigm such that lightweight kernel executions that result in a single output may be executed in parallel and their outputs may be joined together after completion of the executions.

In response to determining that a simple task output for a kernel iteration portion is not independent of another simple task output for another kernel iteration portion (i.e., determination block 914="No"), the computing device may combine the dependent simple task outputs in block 916.

In response to determining that a simple task output for a kernel iteration portion is independent from another simple task output for another kernel iteration portion (i.e., determination block 914="Yes") or after the computing device combines the dependent simple task outputs in block 916, the computing device may output the combined simple task output in block 918. In block 920, the computing device may invalidate in or clear from the simple task table the entry for the simple task associated with the retrieved lightweight kernel.

Figure 10:
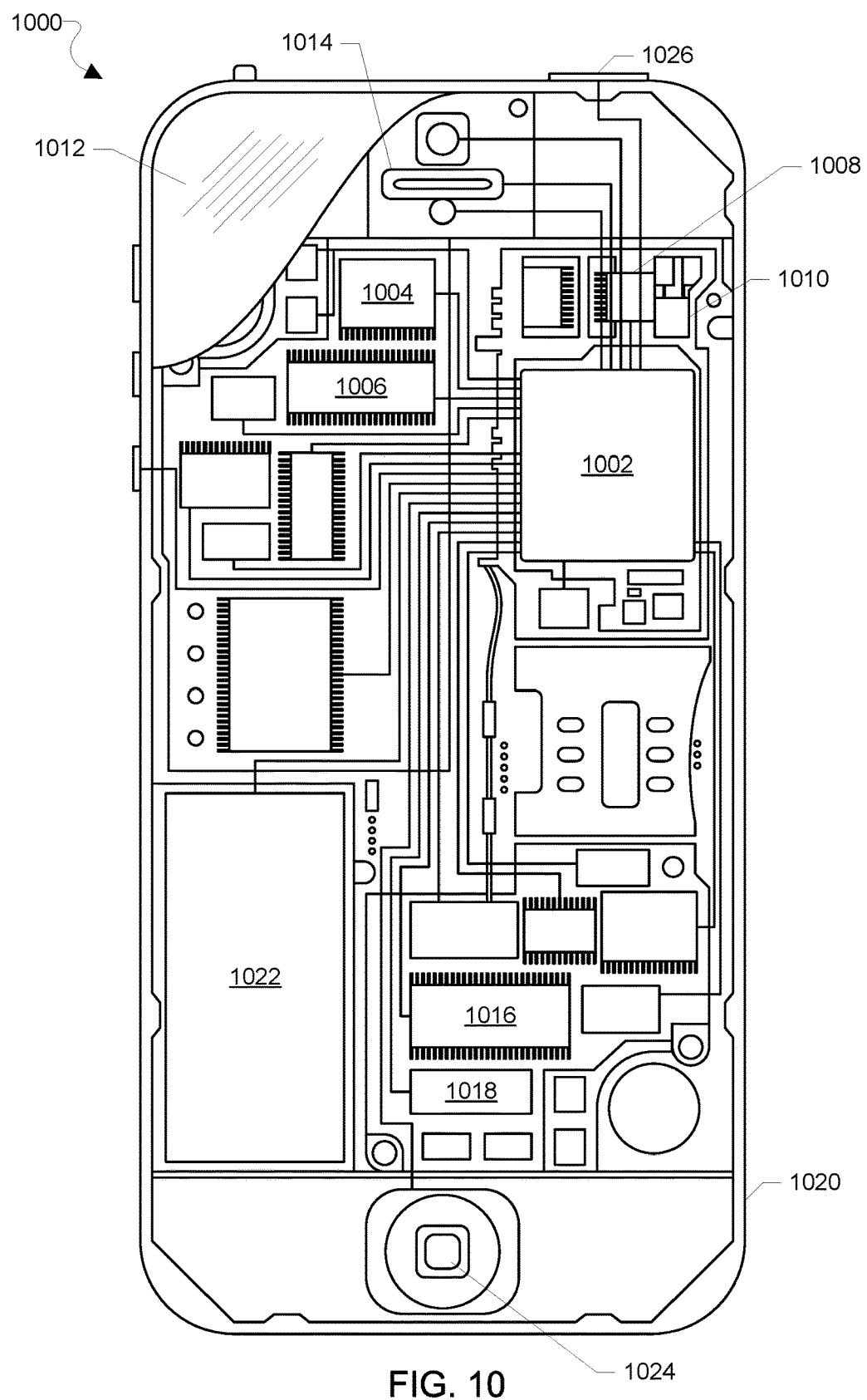
FIG. 10 is component block diagram illustrating an example mobile computing device suitable for use with the various embodiments.

The various aspects (including, but not limited to, aspects discussed above with reference to FIGS. 1-9) may be implemented in a wide variety of computing systems, which may include an example mobile computing device suitable for use with the various aspects illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the computing device 1000 need not have touch screen capability.

The mobile computing device 1000 may have one or more radio signal transceivers 1008 (e.g., Peanut, Bluetooth, Zigbee, Wi-Fi, RF radio, etc.) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as USB, FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components discussed herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
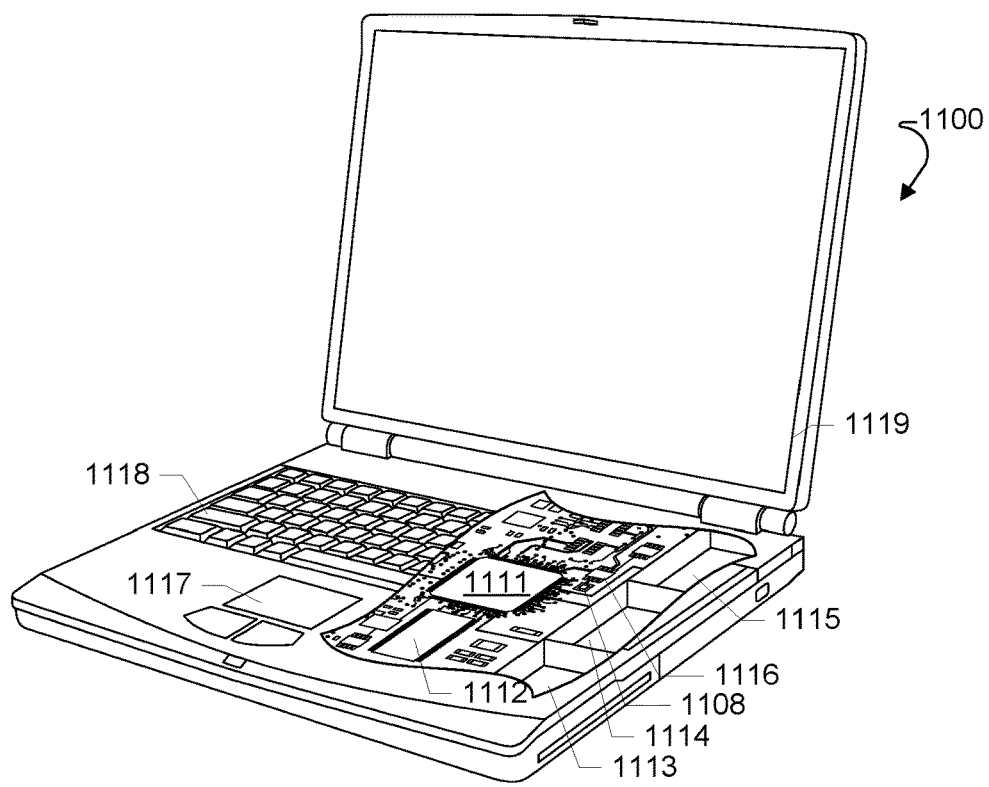
FIG. 11 is component block diagram illustrating an example mobile computing device suitable for use with the various embodiments.

The various aspects (including, but not limited to, aspects discussed above with reference to FIGS. 1-9) may be implemented in a wide variety of computing systems, which may include a variety of mobile computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a Universal Serial Bus (USB) input) as are well known, which may also be used in conjunction with the various aspects.

Figure 12:
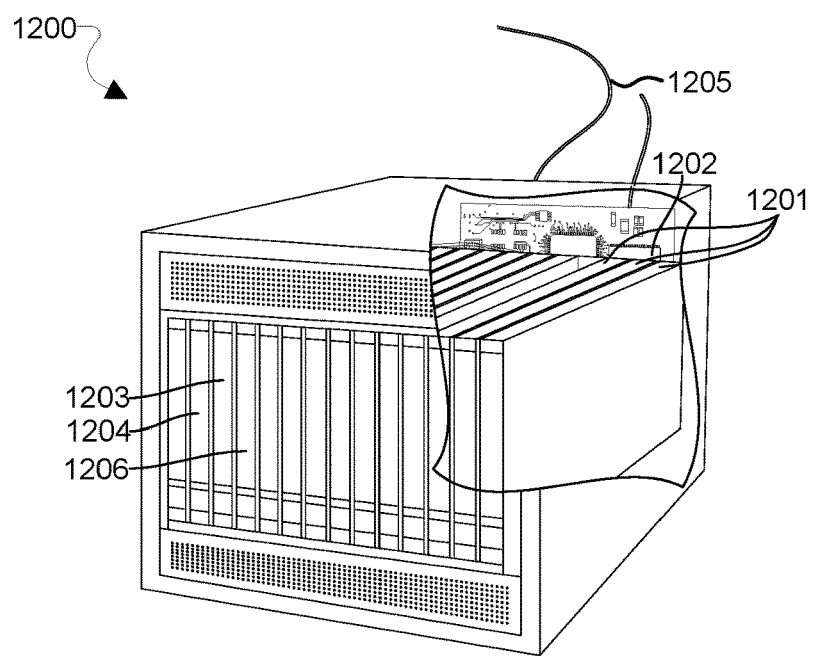
FIG. 12 is component block diagram illustrating an example server suitable for use with the various embodiments.

The various aspects (including, but not limited to, aspects discussed above with reference to FIGS. 1-9) may be implemented in a wide variety of computing systems, which may include any of a variety of commercially available servers for compressing data in server cache memory. An example server 1200 is illustrated in FIG. 12. Such a server 1200 typically includes one or more multi-core processor assemblies 1201 coupled to volatile memory 1202 and a large capacity nonvolatile memory, such as a disk drive 1204. As illustrated in FIG. 12, multi-core processor assemblies 1201 may be added to the server 1200 by inserting them into the racks of the assembly. The server 1200 may also include a floppy disc drive, compact disc (CD) or DVD disc drive 1206 coupled to the processor 1201. The server 1200 may also include network access ports 1203 coupled to the multi-core processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of scheduling and executing lightweight computational procedures in a computing device, comprising:
   determining whether a first task pointer in a task queue is a simple task pointer for a lightweight computational procedure;
   scheduling a first simple task for the lightweight computational procedure for execution by a first thread in response to determining that the first task pointer is a simple task pointer;
   retrieving a kernel pointer for the lightweight computational procedure from an entry of a simple task table, wherein the entry is associated with the simple task pointer; and
   directly executing the lightweight computational procedure as the first simple task.

2. The method of claim 1, further comprising:
   completing execution of the first simple task; and
   updating data of a kernel iteration counter of the entry of the simple task table.

3. The method of claim 2, further comprising:
   determining whether kernel iterations of the lightweight computational procedure are divisible; and
   dividing the kernel iterations of the lightweight computational procedure into iteration portions in response to determining that the kernel iterations of the lightweight computational procedure are divisible,
   wherein:
      scheduling a first simple task for the lightweight computational procedure for execution by a first thread comprises assigning the first simple task with at least one iteration portion;
      completing execution of the first simple task comprises completing a number of executions of the first simple task equal to a number of iterations of the at least one iteration portion assigned to the first simple task; and
      updating data of a kernel iteration counter of the entry of the simple task table comprises updating the data of the kernel iteration counter to reflect completion of the number of iterations of the at least one iteration portion assigned to the first simple task.

4. The method of claim 2, further comprising:
   determining whether all iterations of the first simple task are complete from the data of the kernel iteration counter; and
   clearing the entry of the simple task table in response to determining that all of the iterations of the first simple task are complete.

5. The method of claim 1, further comprising identifying a restriction for executing the lightweight computational procedure, wherein the restriction comprises one of a designated thread for executing the lightweight computational procedure, including a main thread, a critical thread, and a non-critical thread, a latency requirement for executing the lightweight computational procedure, and a proximity of a processor executing the first thread to a memory storing the lightweight computational procedure,
   wherein scheduling a first simple task for the lightweight computational procedure for execution by a first thread comprises selecting the first thread based on the restriction for executing the lightweight computational procedure.

6. The method of claim 1, further comprising:
   determining whether a second task pointer in the task queue is the simple task pointer for the lightweight computational procedure;
   scheduling a second simple task for the lightweight computational procedure for execution by a second thread in response to determining that the second task pointer is the simple task pointer;
   retrieving, from the entry of the simple task table, the kernel pointer for the lightweight computational procedure, wherein the entry is associated with the simple task pointer; and
   directly executing the lightweight computational procedure as the second simple task.

7. The method of claim 6, further comprising:
   combining a first output of the first simple task and a second output of the second simple task.

8. The method of claim 1, further comprising:
   determining whether a requested process includes the lightweight computational procedure;
   determining whether the simple task table is full in response to determining that the requested process includes the lightweight computational procedure;
   creating the entry for the lightweight computational procedure in the simple task table in response to determining that the simple task table is not full;
   adding the simple task pointer associated with the entry to the task queue; and
   adding a normal task pointer associated with the lightweight computational procedure to the task queue in response to determining that the simple task table is full.

9. A computing device, comprising:
   a first processor configured with processor-executable instructions to perform operations comprising:
      determining whether a first task pointer in a task queue is a simple task pointer for a lightweight computational procedure;
      scheduling a first simple task for the lightweight computational procedure for execution by a first thread in response to determining that the first task pointer is a simple task pointer;
      retrieving a kernel pointer for the lightweight computational procedure from an entry of a simple task table, wherein the entry is associated with the simple task pointer; and
      directly executing the lightweight computational procedure as the first simple task.

10. The computing device of claim 9, wherein the first processor is configured with processor-executable instructions to perform operations further comprising:
   completing execution of the first simple task; and updating data of a kernel iteration counter of the entry of the simple task table.

11. The computing device of claim 10, wherein the first processor is configured with processor-executable instructions to perform operations further comprising:
   determining whether kernel iterations of the lightweight computational procedure are divisible; and
   dividing the kernel iterations of the lightweight computational procedure into iteration portions in response to determining that the kernel iterations of the lightweight computational procedure are divisible,
   wherein the first processor is configured with processor-executable instructions to perform operations such that:
      scheduling a first simple task for the lightweight computational procedure for execution by a first thread comprises assigning the first simple task with at least one iteration portion;
      completing execution of the first simple task comprises completing a number of executions of the first simple task equal to a number of iterations of the at least one iteration portion assigned to the first simple task; and
      updating data of a kernel iteration counter of the entry of the simple task table comprises updating the data of the kernel iteration counter to reflect completion of the number of iterations of the at least one iteration portion assigned to the first simple task.

12. The computing device of claim 10, wherein the first processor is configured with processor-executable instructions to perform operations further comprising:
   determining whether all iterations of the first simple task are complete from the data of the kernel iteration counter; and
   clearing the entry of the simple task table in response to determining that all of the iterations of the first simple task are complete.

13. The computing device of claim 9, further comprising:
   a memory communicatively connected to the first processor; and
   a second processor communicatively connected to the first processor,
   wherein the first processor is configured with processor-executable instructions to perform operations further comprising identifying a restriction for executing the lightweight computational procedure, wherein the restriction comprises one of a designated thread for executing the lightweight computational procedure, including a main thread, a critical thread, and a non-critical thread, a latency requirement for executing the lightweight computational procedure, and a proximity of the second processor executing the first thread to the memory storing the lightweight computational procedure, and
   wherein the first processor is configured with processor-executable instructions to perform operations such that scheduling a first simple task for the lightweight computational procedure for execution by a first thread comprises selecting the first thread based on the restriction for executing the lightweight computational procedure.

14. The computing device of claim 9, wherein the first processor is configured with processor-executable instructions to perform operations further comprising:
   determining whether a second task pointer in the task queue is the simple task pointer for the lightweight computational procedure;
   scheduling a second simple task for the lightweight computational procedure for execution by a second thread in response to determining that the second task pointer is the simple task pointer;
   retrieving, from the entry of the simple task table, the kernel pointer for the lightweight computational procedure, wherein the entry is associated with the simple task pointer; and
   directly executing the lightweight computational procedure as the second simple task.

15. The computing device of claim 14, wherein the first processor is configured with processor-executable instructions to perform operations further comprising:
   combining a first output of the first simple task and a second output of the second simple task.

16. The computing device of claim 9, wherein the first processor is configured with processor-executable instructions to perform operations further comprising:
   determining whether a requested process includes the lightweight computational procedure;
   determining whether the simple task table is full in response to determining that the requested process includes the lightweight computational procedure;
   creating the entry for the lightweight computational procedure in the simple task table in response to determining that the simple task table is not full;
   adding the simple task pointer associated with the entry to the task queue; and
   adding a normal task pointer associated with the lightweight computational procedure to the task queue in response to determining that the simple task table is full.

17. A computing device, comprising:
   means for determining whether a first task pointer in a task queue is a simple task pointer for a lightweight computational procedure;
   means for scheduling a first simple task for the lightweight computational procedure for execution by a first thread in response to determining that the first task pointer is a simple task pointer;
   means for retrieving a kernel pointer for the lightweight computational procedure from an entry of a simple task table, wherein the entry is associated with the simple task pointer; and
   means for directly executing the lightweight computational procedure as the first simple task.

18. The computing device of claim 17, further comprising:
   means for completing execution of the first simple task; and
   means for updating data of a kernel iteration counter of the entry of the simple task table.

19. The computing device of claim 18, further comprising:
   means for determining whether kernel iterations of the lightweight computational procedure are divisible; and
   means for dividing the kernel iterations of the lightweight computational procedure into iteration portions in response to determining the kernel iterations of the lightweight computational procedure are divisible,
   wherein:
      means for scheduling a first simple task for the lightweight computational procedure for execution by a first thread comprises means for assigning the first simple task with at least one iteration portion;
      means for completing execution of the first simple task comprises means for completing a number of executions of the first simple task equal to a number of iterations of the at least one iteration portion assigned to the first simple task; and means for updating data of a kernel iteration counter of the entry of the simple task table comprises means for updating data of the kernel iteration counter to reflect completion of the number of iterations of the at least one iteration portion assigned to the first simple task.

20. The computing device of claim 18, further comprising:
    means for determining whether all iterations of the first simple task are complete from data of the kernel iteration counter; and
    means for clearing the entry of the simple task table in response to determining that all of the iterations of the first simple task are complete.

21. The computing device of claim 17, further comprising means for identifying a restriction for executing the lightweight computational procedure, wherein the restriction comprises one of a designated thread for executing the lightweight computational procedure, including a main thread, a critical thread, and a non-critical thread, a latency requirement for executing the lightweight computational procedure, and a proximity of a processor executing the first thread to a memory storing the lightweight computational procedure,
    wherein means for scheduling a first simple task for the lightweight computational procedure for execution by a first thread comprises means for selecting the first thread based on the restriction for executing the lightweight computational procedure.

22. The computing device of claim 17, further comprising:
    means for determining whether a second task pointer in the task queue is the simple task pointer for the lightweight computational procedure;
    means for scheduling a second simple task for the lightweight computational procedure for execution by a second thread in response to determining that the second task pointer is the simple task pointer;
    means for retrieving, from the entry of the simple task table, the kernel pointer for the lightweight computational procedure, wherein the entry is associated with the simple task pointer;
    means for directly executing the lightweight computational procedure as the second simple task; and
    means for combining a first output of the first simple task and a second output of the second simple task.

23. The computing device of claim 17, further comprising:
    means for determining whether a requested process includes the lightweight computational procedure;
    means for determining whether the simple task table is full in response to determining that the requested process includes the lightweight computational procedure;
    means for creating the entry for the lightweight computational procedure in the simple task table in response to determining that the simple task table is not full;
    means for adding the simple task pointer associated with the entry to the task queue; and
    means for adding a normal task pointer associated with the lightweight computational procedure to the task queue in response to determining that the simple task table is full.

24. A non-transitory processor-readable storage medium having stored thereon processor-executable instructions configured to cause a first processor of a computing device to perform operations comprising:
    determining whether a first task pointer in a task queue is a simple task pointer for a lightweight computational procedure;
    scheduling a first simple task for the lightweight computational procedure for execution by a first thread in response to determining that the first task pointer is a simple task pointer;
    retrieving a kernel pointer for the lightweight computational procedure from an entry of a simple task table, wherein the entry is associated with the simple task pointer; and
    directly executing the lightweight computational procedure as the first simple task.

25. The non-transitory processor-readable storage medium of claim 24, wherein the stored processor-executable instructions are configured to cause the first processor to perform operations further comprising:
    completing execution of the first simple task; and
    updating data of a kernel iteration counter of the entry of the simple task table.

26. The non-transitory processor-readable storage medium of claim 25, wherein the stored processor-executable instructions are configured to cause the first processor to perform operations further comprising:
    determining whether kernel iterations of the lightweight computational procedure are divisible; and
    dividing the kernel iterations of the lightweight computational procedure into iteration portions in response to determining that the kernel iterations of the lightweight computational procedure are divisible,
    wherein the stored processor-executable instructions are configured to cause the first processor to perform operations such that:
        scheduling a first simple task for the lightweight computational procedure for execution by a first thread comprises assigning the first simple task with at least one iteration portion;
        completing execution of the first simple task comprises completing a number of executions of the first simple task equal to a number of iterations of the at least one iteration portion assigned to the first simple task; and
        updating data of a kernel iteration counter of the entry of the simple task table comprises updating the data of the kernel iteration counter to reflect completion of the number of iterations of the at least one iteration portion assigned to the first simple task.

27. The non-transitory processor-readable storage medium of claim 25, wherein the stored processor-executable instructions are configured to cause the first processor to perform operations further comprising:
    determining whether all iterations of the first simple task are complete from the data of the kernel iteration counter; and
    clearing the entry of the simple task table in response to determining that all of the iterations of the first simple task are complete.

28. The non-transitory processor-readable storage medium of claim 24, wherein the stored processor-executable instructions are configured to cause the first processor to perform operations further comprising identifying a restriction for executing the lightweight computational procedure, and wherein the stored processor-executable instructions are configured to cause the first processor to perform operations such that:
the restriction comprises one of a designated thread for executing the lightweight computational procedure, including a main thread, a critical thread, and a non-critical thread, a latency requirement for executing the lightweight computational procedure, and a proximity of a second processor executing the first thread to a memory storing the lightweight computational procedure; and
scheduling a first simple task for the lightweight computational procedure for execution by a first thread comprises selecting the first thread based on the restriction for executing the lightweight computational procedure.

29. The non-transitory processor-readable storage medium of claim 24, wherein the stored processor-executable instructions are configured to cause the first processor to perform operations further comprising:
determining whether a second task pointer in the task queue is the simple task pointer for the lightweight computational procedure;
scheduling a second simple task for the lightweight computational procedure for execution by a second thread in response to determining that the second task pointer is the simple task pointer;
retrieving, from the entry of the simple task table, the kernel pointer for the lightweight computational procedure, wherein the entry is associated with the simple task pointer;
directly executing the lightweight computational procedure as the second simple task; and
combining a first output of the first simple task and a second output of the second simple task.

30. The non-transitory processor-readable storage medium of claim 24, wherein the stored processor-executable instructions are configured to cause the first processor to perform operations further comprising:
determining whether a requested process includes the lightweight computational procedure;
determining whether the simple task table is full in response to determining that the requested process includes the lightweight computational procedure;
creating the entry for the lightweight computational procedure in the simple task table in response to determining that the simple task table is not full;
adding the simple task pointer associated with the entry to the task queue; and
adding a normal task pointer associated with the lightweight computational procedure to the task queue in response to determining that the simple task table is full.

* * * * *